United States Patent Office 3,150,134
Patented Sept. 22, 1964

3,150,134
DERIVATIVES OF DIMERCAPTO PYRAZINES
Karlfried Dickoré, Leverkusen, Klaus Sasse, Cologne-Stammheim, and Richard Wegler, Leverkusen, Germany, assignors to Farbenfabriken Bayer Aktiengesellschaft, Leverkusen, Germany, a corporation of Germany
No Drawing. Filed Nov. 21, 1961, Ser. No. 154,059
Claims priority, application Germany Nov. 22, 1960
5 Claims. (Cl. 260—250)

The present invention relates to and has as its objects new and useful insecticidal, acaricidal and partially fungicidal compounds and processes for the production thereof. The new compounds of this invention may be represented by the following general formula

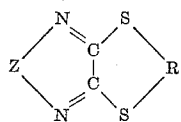

wherein Z denotes a bridge of one or two carbon atoms or of one carbon atom and/or one nitrogen atom, which all may be further substituted, and in which R stands for a shared acyl radical or two separate acyl radicals.

In accordance with the present invention it has now been found that the inventive compounds of good acaricidal activity are obtained by the reaction of mononuclear heterocyclic o-dimercapto compounds of the general formula

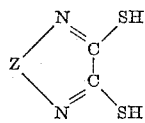

in which Z has the above said significance, with inorganic or organic acid halides, acid anhydrides, isocyanates or thio-isocyanates.

In addition to the activity of the above mentioned quinoxalines, the compounds according to the invention, surprisingly, also possess excellent insecticidal properties. Harmful insects such as fly maggots, grain weevils or cockroaches are effectively destroyed by the new compounds according to the invention.

The reaction of the aforesaid dimercapto compounds with monofunctional acid halides or anhydrides leads to products which contain the acid radical once or twice.

Suitable acid halides are for example (thio)-carboxylic acid halides, chloroformic acid esters, thiocarbonic acid ester halides, sulfenic acid halides, sulfinic acid halides, sulfonic acid halides, carbamic acid halides, chlorosulfonic acid esters or chlorosulfonic acid halides. Bifunctional acid halides such as phosgene, thiophosgene, thionyl chloride or sulfuryl chloride lead to binuclear heterocyclic compounds.

The production of the new substances according to the invention is carried out by methods known in principle. For example, the said dimercapto compound can be reacted in an aqueous solution or in admixture with water-miscible or -immiscible organic solvents, with less moisture-sensitive acid halides in the presence of an acid-binding substance. Water-sensitive acid halides are expediently reacted with the dimercapto compounds in an inert organic solvent such as hydrocarbons, dioxan, acetone, in the presence of an acid-binding agent. Working up of the reaction mixtures is carried out by methods commonly applied in organic chemistry.

As examples for the special utility of the inventive compounds the cyclic trithiocarbonates of the following formulae (I) 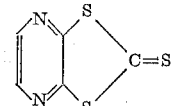

(II) 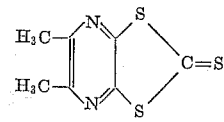

have been tested against spider mites.

Aqueous emulsions of the aforementioned compounds have been prepared by admixing them with the same amount of an auxiliary solvent (aceton). A commercial emulsifier (benzyl hydroxy diphenyl polyglycol ether) is added in an amount of 20% referred to active ingredient. This premixture is diluted with water to the desired concentration. The test has been carried out as follows:

(Contact-insecticidal action): Bean plants (*Phaseolus vulgaris*) of about 15 inches height are sprayed drip wet with solutions as prepared above in a concentration as shown below. The bean plants have been infested heavily with the two-spotted spider (special *Tetranychus telarius*). Evaluation has been carried out after 24 hours, 48 hours and 8 days. The following results have been obtained: With compound I spider mites (*Tetranychus telarius*) are killed completely with 0.1% solutions within 48 hours. With compound II spider mites of the type *Euproctis chrysorrhoea* are killed completely with 0.02% solutions and spider mites of the type *Tetranychus telarius* are killed to 95% with 0.02% solutions.

The following examples are given for the purpose of illustrating the invention:

*Example 1*

6 grams of thiophosgene are added dropwise at 0–5° C. to a solution of 7.2 grams of 2.3-dimercapto-pyrazine in a solution of 5 grams of sodium hydroxide in 100 ml. of water. The mixture is further stirred at room temperature for 1 hour, the precipitated solid product is filtered off with suction, washed with water and dried over vacuum. 7 grams (75% of the theoretical) of the cyclic trithio-carbonate are thus obtained.

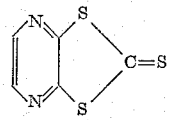

M.P. 169–171° C.

*Example 2*

28.8 grams of 2.3-dimercapto-pyrazine are suspended in 250 ml. of toluene, a concentrated aqueous solution of 16 grams of sodium hydroxide is added and the water is distilled off azeotropically; subsequently phosgene is introduced without cooling whereupon the internal temperature rises to about 60° C., the mixture is then heated to boiling point of the solvent while the introduction is continued and, finally, the total of solvent is distilled off under vacuum.

The residue is re-crystallized from acetone. 27 grams (80% of the theoretical) of the compound

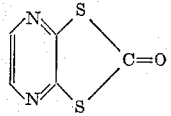

are thus obtained. M.P. 81° C.

Example 3

To a suspension of 21.6 grams of the sodium salt of 2.3-dimethyl-5.6-dimercaptopyrazine in 100 ml. of benzene there is added dropwise at 10 to 20° C. a solution of excess phosgene in benzene. Thereafter the reaction mixture is after-stirred for 1 hour at 20° C., then for a further half an hour under reflux-boiling, filtered hot and the filtrate is concentrated. While cooling the mixture crystallizes and there are obtained 15.5 grams (78% of the theoretical) of the cyclic dithiocarbonate of the following formula

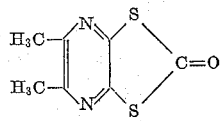

which after recrystallization from petrol ether or methanol melts at 78° C.

Example 4

21.6 grams of the sodium salt of 2.3-dimethyl-5.6-dimercaptopyrazine are reacted with thiophosgene in the manner as described in Example 3. There are obtained 15 grams of the following compound:

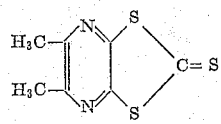

of M.P. 136° C. (from methanol).

Example 5

To a suspension of 21.6 grams of the sodium salt of 2.3-dimethyl-5.6-dimercaptopyrazine in 100 ml. of benzene there are added dropwise at a temperature of 10 to 20° C. 32 grams of chloroformic acid methyl ester. This mixture then is boiled for 1 hour under reflux, then filtered hot and the solvent is distilled off completely. The remaining oil crystallizes after rubbing on with little methanol. There are obtained 11 grams of a compound of the following formula

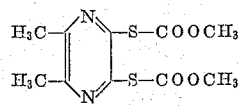

of M.P. 58 to 63° C.

By the same way there may be obtained the compounds of the following formulae:

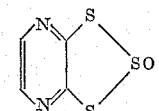

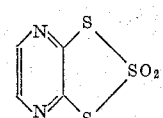

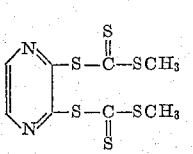

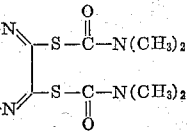

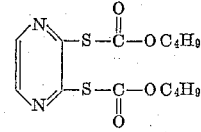

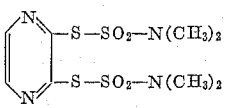

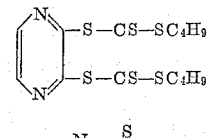

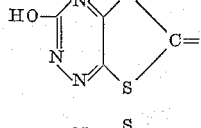

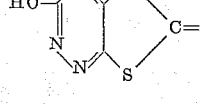

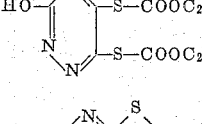

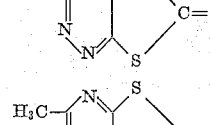

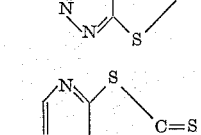

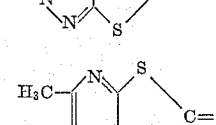

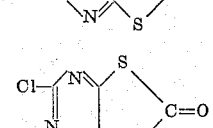

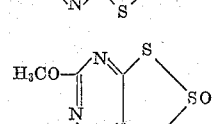

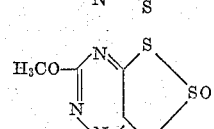

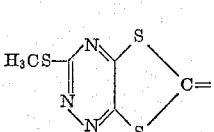

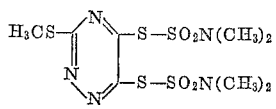
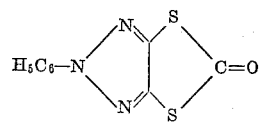
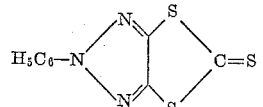
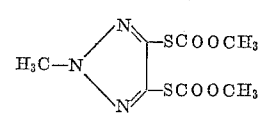
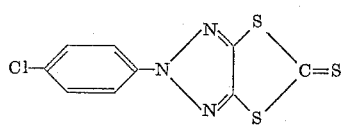
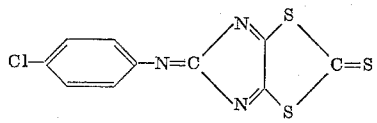
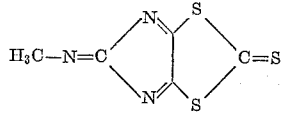
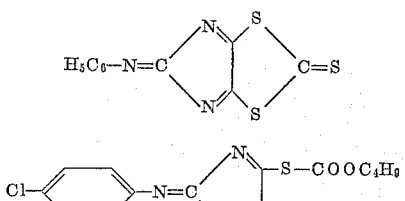
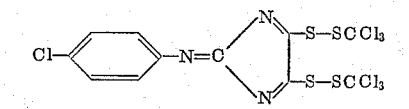
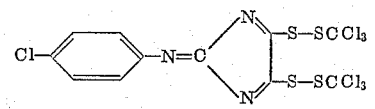

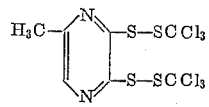

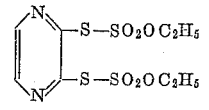

We claim:
1. A compound of the formula

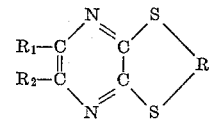

wherein $R_1$ and $R_2$ are members selected from the group consisting of hydrogen, and lower alkyl, and R is a member selected from the group consisting of thionyl, carbonyl, and $=SO_2$.

2. The compound of the following formula

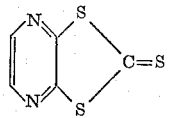

3. The compound of the following formula

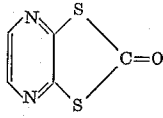

4. The compound of the following formula

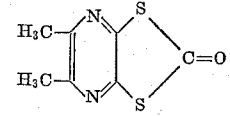

5. The compound of the following formula

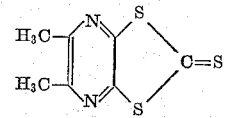

No references cited.